United States Patent [19]
Alfonso

[11] Patent Number: 4,993,045
[45] Date of Patent: Feb. 12, 1991

[54] MODEM DIAGNOSTIC LOOP

[75] Inventor: Lazaro E. Alfonso, Miami Lakes, Fla.

[73] Assignee: Racal Data Communications Inc., Sunrise, Fla.

[21] Appl. No.: 264,914

[22] Filed: Oct. 31, 1988

[51] Int. Cl.$^5$ .............................................. H04B 1/38
[52] U.S. Cl. ........................................ 375/7; 375/10; 370/15
[58] Field of Search ............... 375/7, 8, 10; 371/15, 371/22, 24, 25; 370/13, 15, 24, 31; 455/67, 73, 79

[56] References Cited

U.S. PATENT DOCUMENTS

| | | | |
|---|---|---|---|
| 3,937,882 | 2/1976 | Bingham | 370/15 |
| 4,039,751 | 8/1977 | Couturier et al. | 370/15 |
| 4,127,816 | 11/1978 | Grosso et al. | 370/15 |
| 4,656,643 | 4/1987 | Geneste et al. | 375/10 |
| 4,686,668 | 8/1987 | Koseki et al. | 370/15 |

OTHER PUBLICATIONS

CCITT Recommendation V.54, pp. 281–297, 1984.
The Dow Jones-Irwin Handbook of Telecommunications, by Greene, pp. 617–619, 1986.
Data Transmission Analysis Design Application by Tugal et al, pp. 266–271, 1982.

Primary Examiner—Douglas W. Olms
Assistant Examiner—Stephen Chin
Attorney, Agent, or Firm—Jerry A. Miller

[57] ABSTRACT

A modem side diagnostic loopback apparatus for a two wire communication circuit includes a transformer having a mechanism for connecting to a two wire transmission line on a transmission line side and for coupling to a modem on a modem side. A modem transmitter generates modem transmitter signals and a modem receiver receives signals from the transmission line. A subtracting circuit subtracts the modem transmitter signal from a signal containing both the modem transmitter signal and the received signals. The subtracting circuit may be selectively unbalanced so that the transmitter signals are supplied to the modem receiver and the received signals are inhibited from being received by the modem receiver to effect a loopback.

13 Claims, 1 Drawing Sheet

MODEM DIAGNOSTIC LOOP

BACKGROUND

1. Field of the Invention

This invention relates generally to the field of modem diagnostics and more particularly to a method and apparatus for providing modem side loopback capabilities in a two wire communication device (such as a dial up modem).

2. Background of the Invention

Loopback testing has long been provided as a mechanism for locating faults and impairments in telephone and data communication circuits. Loopback testing is generally described in CCITT recommendation V.54. Such loopback testing is normally accomplished by use of relays or the like to couple an output signal from a modem or similar device back into the input in order to simulate a complete communications path. By performing such loopbacks at various locations in the communication circuit, a fault or failure may be isolated to a line or device connected to the line.

Such loopback testing is commonplace in four wire data communications circuits where the loopback is accomplished by coupling one set of wires to the other. However, in a two wire circuit, it is difficult to accomplish loopbacks in all of the desired locations. The present invention addresses this difficult by providing a loopback capability which provides for looping back almost as far as the telephone line connection in a two wire modem.

SUMMARY OF THE INVENTION

It is an object of the present invention to provide an improved loopback mechanism for two wire communication circuits.

It is another object of the present invention to provide this loopback mechanism at a point as close as possible within the modem to the two wire telephone line. It is an advantage of this invention that expensive relays are not required to implement and the entire communication circuit with the exception of the coupling transformer can be tested when loopback is engaged.

These and other objects of the invention will become apparent to those skilled in the art upon consideration of the following description of the invention.

In one embodiment of the present invention, a diagnostic loopback apparatus, according to the present invention includes a mechanism for coupling a transmitter and a receiver to a two wire transmission line. The two wire transmission line is converted into separate transmit and receive paths, the converting circuit including a circuit for removing signals produced by the transmitter from signals to be supplied to the receiver. An unbalancing circuit selectively disabling the removing circuit so that the signals produced by the transmitter are supplied to the receiver.

In another embodiment of the present invention a modem side diagnostic loopback apparatus for a two wire communication circuit includes a transformer having a mechanism for connecting to a two wire transmission line on a transmission line side and for coupling to a modem on a modem side. A modem transmitter generates modem transmitter signals and a modem receiver receives signals from the transmission line. A subtracting circuit subtracts the modem transmitter signal from a signal containing both the modem transmitter signal and the received signals. The subtracting circuit may be selectively unbalanced so that the transmitter signals are supplied to the modem receiver and the received signals are inhibited from being received by the modem receiver to effect a loopback.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
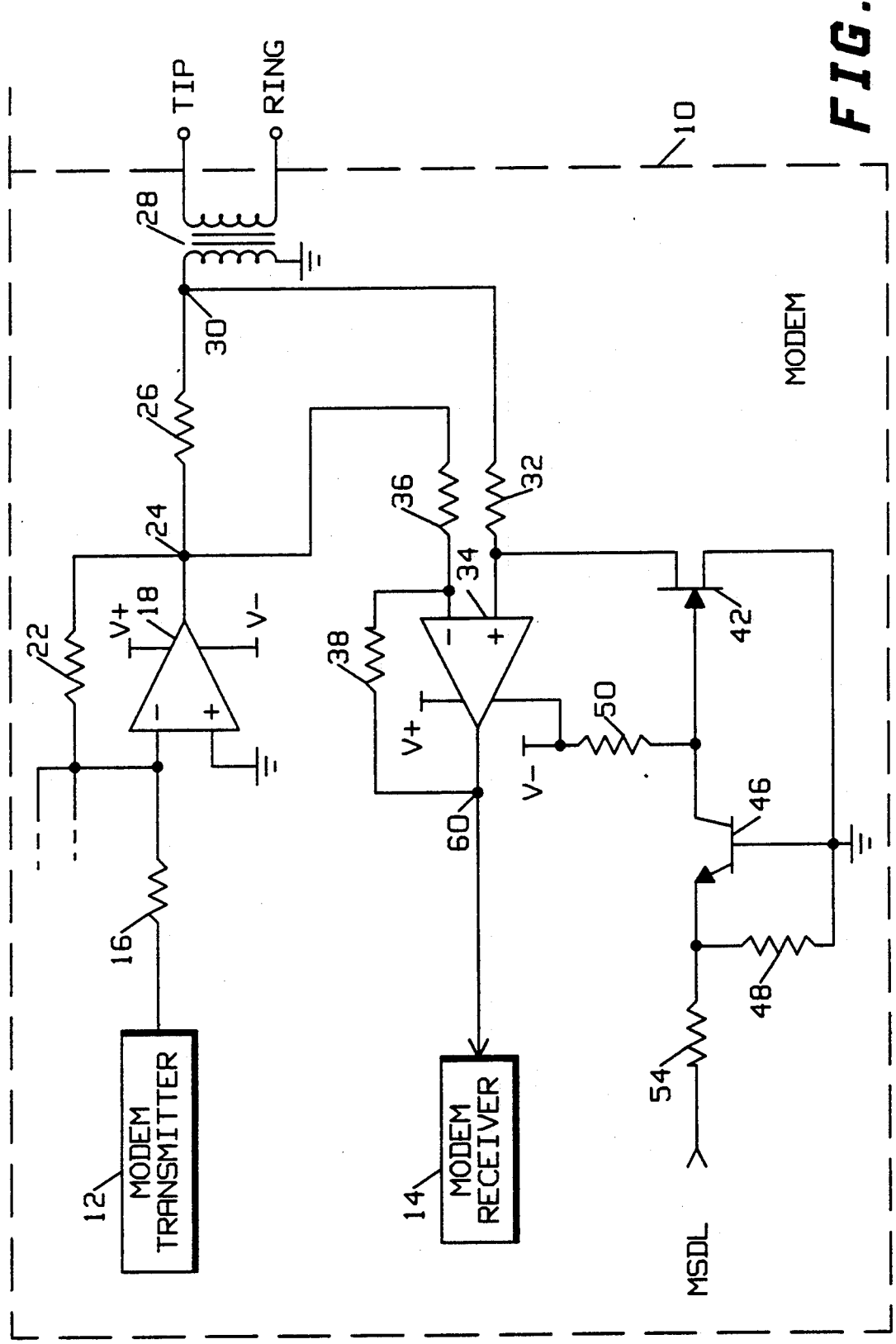
FIG. 1 is a schematic representation of the preferred embodiment of the present invention.

Turning now to FIG. 1, a modem designated generally as 10 includes a modem transmitter 12 and a modem receiver 14. In the preferred embodiment, the output of the modem transmitter is coupled through a resister 16 to the inverting input of an operational amplifier 18. The non-inverting input of operational amplifier 18 is grounded. A feedback resistor 22 provides stabilizing negative feedback and in conjunction with resister 16 determines the gain of amplifier 18. Amplifier 18 is used to isolate the modem transmitter 12 and also, in the preferred embodiment, is used as summing amplifier which may be utilized to add test signals or secondary channel signals to the transmitted waveform.

The output 24 of amplifier 18 is coupled through a matching resister 26 to one side of a transformer 28. The second terminal of this modem side of transformer 28 is grounded. The other winding of transformer 28 serves as tip and ring wire connections to the telephone line. By properly selecting the value of resistor 26, the impedance of the transmission line is matched in a conventional manner. The junction of transformer 28 and resistor 26 is referred to as node 30. Node 30 is also connected through a resister 32 to the non-inverting input of a second operation amplifier 34. Resister 32 is selected to be very large compared with the impedance seen at node 30 so as not to interfere with the matching. The output of amplifier 18 is connected through resister 36 to the inverting terminal of amplifier 34. A feedback resister 38 coupled from the output of amplifier 34 to its inverting input provides stabilizing negative feedback as well as a gain of $-1$ for the signal at the output of amplifier 18. That is, resisters 36 and 38 are selected to have the same value in the preferred embodiment. The output of amplifier 34 is coupled to the modem receiver 14. Those skilled in the art will appreciate that the non-inverting input of amplifier 34 has an extremely high impedance and coupled with the resister 32 poses no significant load to node 30. The signal at node 30 will experience a voltage gain of 2 through amplifier 34 to its output while the signal at the output of amplifier 18 experiences a voltage gain of $-1$ through amplifier 34. Of course these exact gain numbers are not to be limiting but advantageously provide for the conversion from two wire to four wire as well as providing the loopback capability of the present invention. However, variations will occur to those skilled in the art.

The non-inverting input of amplifier 34 is connected to the drain of an N-channel JFET 42. The source of JFET 42 is grounded. The gate of JFET 42 is coupled to the collector of an NPN transistor 46. The base of transistor 46 is grounded and the emitter of transmitter 46 is biased toward ground by a resistor 48. The gate of transistor 42 and the collector of transistor 46 are biased toward a negative power supply designated V— by a resistor 50. V— may be one side of a split power supply used for powering amplifiers 18 and 34, having a positive voltage (for example 12 volts) designated V+ and a negative supply (for example −12 volts) designated —. A resister 54 has one side coupled to the emitter of transistor 46 with the other side of resister 54 being used as a control line designed MSDL (Modem Side Diagnostic Loop).

In operation, modem transmitter 12 generates signals which are passed through amplifier 18. The signal at the output 24 of amplifier 18 is then divided by voltage divider made up of resister 26 in series with the impendance of transformer 28. If porperly matched by matching resister 26, the voltage at node 30 will be half the voltage present at the output 24 of the amplifier 18. This voltage will be reflected over to the transmission line side winding of transformer 28 and will in turn be transmitted over the transmission line.

Signals coming into the modem from the transmission line pass through transformer 28 to node 30. The signal at node 30 is passed through amplifier 34 in non-inverting fashion to modem receiver 14.

It should be noted that the signal present at node 30 includes both signals received from the transmission line and signals transmitted by modem transmitter 12. The output 24 of amplifier 18 (that is the signal from modsem transmitter 12) is also provided through register 36 to the inverting terminal of amplifier 34. In this manner amplifier 34 acts as a subtracting circuit so that the signal from modem transmitter 12 is subtracted from the signal at node 30 which contains both signals from the transmission line and signals from the modem transmitter using subtracting amplifier 34. Those skilled in the art will note that there is a gain of two at the noninverting path and a gain of only one at the inverting path. However, it should also be noted that the modem transmitter component at the signal node 30 is divided by two by the voltage divided set up by resister 26 and transformer 28. Thus, all signal originating from modem transmitter 12 is effectively canceled out by amplifier 34. This is perhaps more easily explained by the following equations where the numerical designators from FIG. 1 are used as subscripts for the resister values. Also, transformer 28 is modeled, for purposes of these equations as a resister. Thus, in normal operation, the signal at noe 60 (the output of amplifier 34) expressed in terms of the voltages at nodes 24 and nodes 24 and 30 are as follows:

$$V_{30} = V_{Line} + \frac{V_{24} * R_{28}}{R_{26} + R_{28}}$$

$$V_{60} = \left(1 + \frac{R_{38}}{R_{32}}\right) * V_{30} - \frac{R_{38} * V_{24}}{R_{36}}$$

Since $$\frac{R_{28}}{R_{26} + R_{28}} = \frac{1}{2}$$

if properly matched, and $R_{32} = R_{38} = R_{36}$ $$V_{30} = V_{Line} + \frac{V_{24}}{2}.$$

So, $$V_{60} = (1 + 1) * V_{30} - V_{24}$$

$$V_{60} = 2 * \left(V_{Line} + \frac{V_{24}}{2}\right) - V_{24}$$

$$V_{60} = 2 V_{Line}$$

Thus, during normal operation when MSDL = "low" and the loop is not active, the circuit of FIG. 1 eliminates the modem transmitter signal from the receive path. It should be noted that the contribution of $V_{Line}$ to $V_{24}$ is negligible.

Thus the circuit of FIG. 1 provides the function of converting from a four wire type circuit on the modem side to a two wire circuit on the transmission line side. In order to perform a loopback, the present invention provides for unbalancing the summation occurring at amplifier 34 to eliminate the signal from the transmission line and essentially all effects of the signal at node 30. Thus the present loopback provides the ability to test all components of the modem transmitter and receiver path with the exception of transformer 28 and resisters 26 and 32.

In order to implement the loopback, the signal designated MSDL, which is normally a TTL zero (approximately ground) is switched to a TTL one (approximately five volts). This has the effect of turning on transistor 42 through level converting transistor 46 so that the noninverting input of amplifier 34 is grounded. This in effect shorts out the signal at node 30 to ground and provides that the only input to amplifier 34 is the signal at node 34. Thus when MSDL is driven to a TTL logic high, the modem transmitter signal is passed through amplifier 18 to node 24 where it is then looped backed to amplifier 34 through resister 36 to node 60 and in turn to modem receiver 16. It is also noted that the signal from modem transmitter 12 continues to be passed through transformer 28 to the transmission line. This may be advantageously utilized in some circumstances.

When MSDL is high and JFET 42 is turned on:

$$V_{60} = \frac{-R_{38} * V_{24}}{R_{36}} = -V_{24}.$$

Transistor 42 behaves as a simple switch which is normally open circuited allowing amplifier 34 to perform its normal function of subtracting the transmitter signal from the combined transmitter and transmission line signal at node 30. Depending on the logic definition of MSDL, other level converting circuits may be utilized to accomplish the turning on of transistor 42. Similarly, transistor 42 could be replaced by a relay, an analog switch, a mechanical switch or other suitable substitute. The circuitry for biasing transistor 46 in a common base switch configuration is simply utilized to provide an appropriate conversion from TTL which is utilized in the preferred embodiment. Numerous other possibilities exist for level conversions for other logic families such as CMOS or ECL.

Signal MSDL may be changed to a logic high by actuation of a control switch by the operator or may be automatically generated by internal or external diagnostic circuitry as desired. Those skilled in the art will recognize that the present invention may be used either with dedicated two wire modems, dial up modems or dial backup circuits for four wire modems. Not only is the present invention useful in finding field problems, but also may be used to test the modem in production environments. Additionally, the present invention may be used with other data communication devices such as digital service units and ISDN terminal adapters intended for two wire use (e.g. so called "ping pong" circuits and the like). Other uses will occur to those skilled in the art.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A diagnostic loopback apparatus, comprising in combination:
    means for coupling a transmitter and a receiver to a two wire transmission line;
    converting means for converting said two wire transmission line into separate transmit and receive paths, said converting means including removing means having a differential input amplifier stage with balanced differential inputs, for removing signals produced by said transmitter from signals to be supplied to said receiver; and
    unbalancing means for selectively disabling said removing means by unbalancing said differential inputs so that said signals produced by said transmitter are supplied to said receive.

2. The apparatus of claim 1, wherein said transmitter includes a modem transmitter and said receiver includes a modem receiver.

3. The apparatus of claim 1, wherein said unbalancing means includes means for disabling a signal path to said receiver, said signal path to said receiver providing a path from said transmission line to said receiver.

4. The apparatus of claim 3, wherein said transmission path also provides a path for transmitter signals used to cancel other transmitter signals.

5. The apparatus of claim 1, wherein said converting means further comprises a subtracting means for subtracting said transmitter signal from a signal containing both said transmitter signal and a signal from said transmission line.

6. The apparatus of claim 5, wherein said unbalancing means includes means for disabling said subtracting means.

7. The apparatus of claim 6, wherein said unbalancing means includes means for removing an input from said subtracting means.

8. A modem side diagnostic loopback apparatus, comprising in combination:
    a modem transmitter for generating modem transmitter signals;
    a modem receiver for receiving signals from said transmission line;
    a transformer having means for connecting to a two wire transmission line on a transmission line side and for coupling to said modem transmitter and said modem receiver at a common node on a modem side;
    subtracting means for subtracting said modem transmitter signal from a signal containing both said modem transmitter and said received signals; and
    unbalancing means for selectively disabling said subtracting means so that said transmitter signals are supplied to said modem receiver and said received signals are inhibited from being received by said modem receiver.

9. The apparatus of claim 8, wherein said unbalancing means includes means for removing an input from said subtracting means.

10. The apparatus of claim 9, wherein said removing means includes means for connecting said input of said subtracting means to ground.

11. A method for providing a modem side diagnostic loopback in a two wire communication circuit, comprising the steps of:
    coupling a transmitter and a receiver to said two wire communication circuit;
    converting said two wire communication circuit into separate transmit and receive paths by removing signals produced by the transmitter from signals to be supplied to the receiver using a converting circuit, said converting circuit including a subtracting amplifier having a pair of inputs; and
    selectively unbalancing said converting circuit by disabling one of said inputs so that the signals produced by said transmitter are supplied to said receiver and subtraction no longer takes place in said converting circuit.

12. The method of claim 11, wherein said converting step includes subtracting said transmitter signal from a signal including said transmitter signal and a signal from said communication circuit in a subtracting means.

13. The method of claim 12, wherein said subtracting step includes selectively removing said signal including said transmitter signal and said signal from said communication circuit from said subtracting means.

* * * * *